United States Patent
Anschel (10) Patent No.: US 10,920,658 B2
(45) Date of Patent: Feb. 16, 2021

(54) WASTE HEAT POWERED EXHAUST PUMP

(71) Applicant: BorgWarner Inc., Auburn Hills, MI (US)

(72) Inventor: Paul K. Anschel, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 418 days.

(21) Appl. No.: 15/803,204

(22) Filed: Nov. 3, 2017

(65) Prior Publication Data

US 2019/0136748 A1 May 9, 2019

(51) Int. Cl.
| | | |
|---|---|---|
| *F02B 37/00* | (2006.01) | |
| *F01N 5/02* | (2006.01) | |
| *F01N 5/04* | (2006.01) | |

(52) U.S. Cl.
CPC ............. *F02B 37/005* (2013.01); *F01N 5/02* (2013.01); *F01N 5/04* (2013.01); *F02B 37/004* (2013.01); *F01N 2240/02* (2013.01)

(58) Field of Classification Search
CPC .......... F01N 5/02; F01N 5/04; F01N 2240/02; F02B 37/004; F02B 37/005; F01K 23/065; F01K 23/10; F02G 5/02; F02G 5/04
USPC ........................................ 60/605.1, 618, 670
See application file for complete search history.

(56) References Cited

U.S. PATENT DOCUMENTS

| | | | | |
|---|---|---|---|---|
| 8,196,406 B2* | 6/2012 | Oser | .............. | F01K 19/08 60/688 |
| 8,628,025 B2* | 1/2014 | Bucknell | ........... | F01N 5/02 123/41.21 |
| 2007/0119175 A1* | 5/2007 | Ruggieri | ......... | F01K 25/06 60/649 |
| 2009/0178407 A1* | 7/2009 | Joergl | ............ | F01N 3/021 60/602 |
| 2011/0209473 A1* | 9/2011 | Fritz | ............ | F01K 23/065 60/605.2 |
| 2013/0199178 A1* | 8/2013 | Kanou | ............ | F01K 7/22 60/605.2 |
| 2014/0144136 A1* | 5/2014 | Versteyhe | ........ | F02G 5/02 60/605.1 |
| 2015/0316004 A1* | 11/2015 | Balthes | ........ | F01N 3/0231 60/274 |

(Continued)

*Primary Examiner* — Audrey K Bradley
*Assistant Examiner* — Dapinder Singh
(74) *Attorney, Agent, or Firm* — Howard & Howard Attorneys PLLC (57) ABSTRACT

A number of variations may include a combustion engine tailpipe exhaust circuit defining an exhaust stream and a waste heat recovery system constructed and arranged to recover thermal energy from at least one of a tailpipe exhaust circuit, exhaust stream, charge air cooler, exhaust gas recirculation fluid stream, or coolant stream. The waste heat recovery system may include an expander assembly that may include a first pump, an expander, an evaporator, and a condenser. A second pump driven by the waste heat recovery system may be in fluid communication with the tailpipe exhaust circuit and exhaust stream and may be constructed and arranged to reduce exhaust pressure in the tailpipe exhaust circuit and exhaust stream. A third pump may be in fluid communication with an exhaust gas recirculation fluid stream and which is constructed and arranged to pump the exhaust gas recirculation fluid stream within the exhaust gas recirculation system.

19 Claims, 5 Drawing Sheets

(56) References Cited

U.S. PATENT DOCUMENTS

2016/0194983 A1* 7/2016 Freund .................... F01K 11/00
  60/651
2016/0312687 A1* 10/2016 Kemmerling ......... F02B 37/002
2017/0306806 A1* 10/2017 Kardos ................. F01K 23/065

* cited by examiner

WASTE HEAT POWERED EXHAUST PUMP

TECHNICAL FIELD

The field to which the disclosure generally relates includes waste heat recovery.

BACKGROUND

The inclusion of increasing numbers of emission control devices, such as particulate filters or selective catalytic reduction after-treatments, within engine exhaust streams has increased backpressure on combustion engine cylinders which in turn increases the pumping work of the engine and may negatively impact overall engine efficiency and fuel efficiency. Additionally, a negative pressure differential between engine intake manifold and exhaust pressure is required to drive an exhaust gas recirculation system but may negatively impact engine efficiency.

Waste heat recovery systems may be utilized in combustion engine systems to recover waste heat from exhaust gas or other waste fluids.

An organic Rankine cycle (ORC) waste heat recovery system is a thermodynamic cycle commonly used in power plants whereby thermal energy is converted into mechanical work. The cycle consists of four steps: first, a pressurized working fluid is directed to an evaporator where it is evaporated. The superheated vapor may then be passed through an expansion device (turbine or other expander) in which the gas may be expanded to extract mechanical work, and then may be passed through a condenser where it may be re-condensed to a liquid state. In a final step, a pump may be used to pressurize and return the liquefied working fluid to the boiler or heat exchanger. In a Rankine cycle, heat may be converted into useful work that can itself be converted into electricity which otherwise may have been lost to the environment via the vehicle exhaust, the radiator that cools the engine, and other pathways.

SUMMARY OF ILLUSTRATIVE VARIATIONS

A number of variations may include a product that may include a combustion engine tailpipe exhaust circuit defining an exhaust stream and a waste heat recovery system constructed and arranged to recover waste heat from the exhaust stream that may include an expander assembly that may include a first pump and an expander, the waste heat recovery system may further include a condenser, an evaporator, and a second pump; and wherein the second pump may be in fluid communication with the tailpipe exhaust circuit and exhaust stream and may be constructed and arranged to reduce exhaust pressure in the tailpipe exhaust circuit and exhaust stream. In any variations, the waste heat recovery system may be constructed and arranged to recover heat from EGR fluid streams, exhaust streams, coolant streams, charge air cooler circuits, or other similar systems.

A number of variations may include a product that may include a combustion engine assembly that may include an exhaust gas recirculation system that may define an exhaust gas recirculation fluid stream; a waste heat recovery system constructed and arranged to recover waste heat from the exhaust gas recirculation fluid stream may include an expander assembly that may include a first pump and an expander, the waste heat recovery system further may include a condenser, an evaporator, and a second pump; and wherein the expander may be in communication with the second pump which may be in fluid communication with the exhaust gas recirculation fluid stream and may be constructed and arranged to pump the exhaust gas recirculation fluid stream within the exhaust gas recirculation system.

A number of variations may include a product that may include a combustion engine assembly that may include an exhaust gas recirculation system defining an exhaust gas recirculation fluid stream, a tailpipe exhaust circuit defining an exhaust stream, and a waste heat recovery system constructed and arranged to recover waste heat from at least one of the exhaust gas recirculation fluid stream or exhaust stream; the waste heat recovery system may include a first pump, an evaporator, an expander, and a condenser. The waste heat recovery system further may include a second pump and a third pump; wherein the second pump may be downstream of an exhaust stream after-treatment and may be in fluid communication with the tailpipe exhaust circuit and exhaust stream and may be constructed and arranged to reduce exhaust pressure in the tailpipe exhaust circuit and exhaust stream; and wherein the third pump may be in fluid communication with the exhaust gas recirculation fluid stream and may be constructed and arranged to pump the exhaust gas recirculation fluid stream within the exhaust gas recirculation system.

Other illustrative variations within the scope of the invention will become apparent from the detailed description provided hereinafter. It should be understood that the detailed description and enumerated variations, while disclosing optional variations, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and are still considered to be within the scope of the invention.

In a number of variations, organic Rankine cycle (ORC) waste heat recovery systems may be used to improve the fuel efficiency of vehicle engines; for example, tractor-trailers that are used for long-haul commercial trucking. An ORC system may use waste heat from the engine to evaporate or engage in heat transfer with a working fluid. This fluid may be expanded within the thermodynamic cycle to create useful power. In a number of variations, the expansion device may be a turbine in which the working fluid performs work on a turbine wheel connected to a shaft. The shaft of the turbine may be connected to the engine crank via a transmission or by connecting the shaft to a generator, the waste heat may be converted to electric power that may be stored or used by the vehicle in other ancillary systems. The working fluid may then be condensed and returned to the boiler or heat exchanger via a pump. One variation may consist of a waste heat recovery system where the thermally-driven output device (such as an expander) is used to drive an exhaust gas pump. The exhaust gas pump may be located anywhere within the exhaust stream. According to one variation, the exhaust gas pump may be used to reduce the exhaust pressure to near or below atmospheric conditions for reducing the engine pumping work and increasing the fuel efficiency of the engine. An alternate embodiment may use the exhaust gas pump for pumping exhaust gasses for an exhaust gas recirculation (EGR) system. The waste heat recovery system may be constructed and arranged to recover the thermal energy from an exhaust stream, EGR system, engine coolant circuit, charge air cooler circuit, or tailpipe exhaust circuit and EGR sources.

Figure 1:
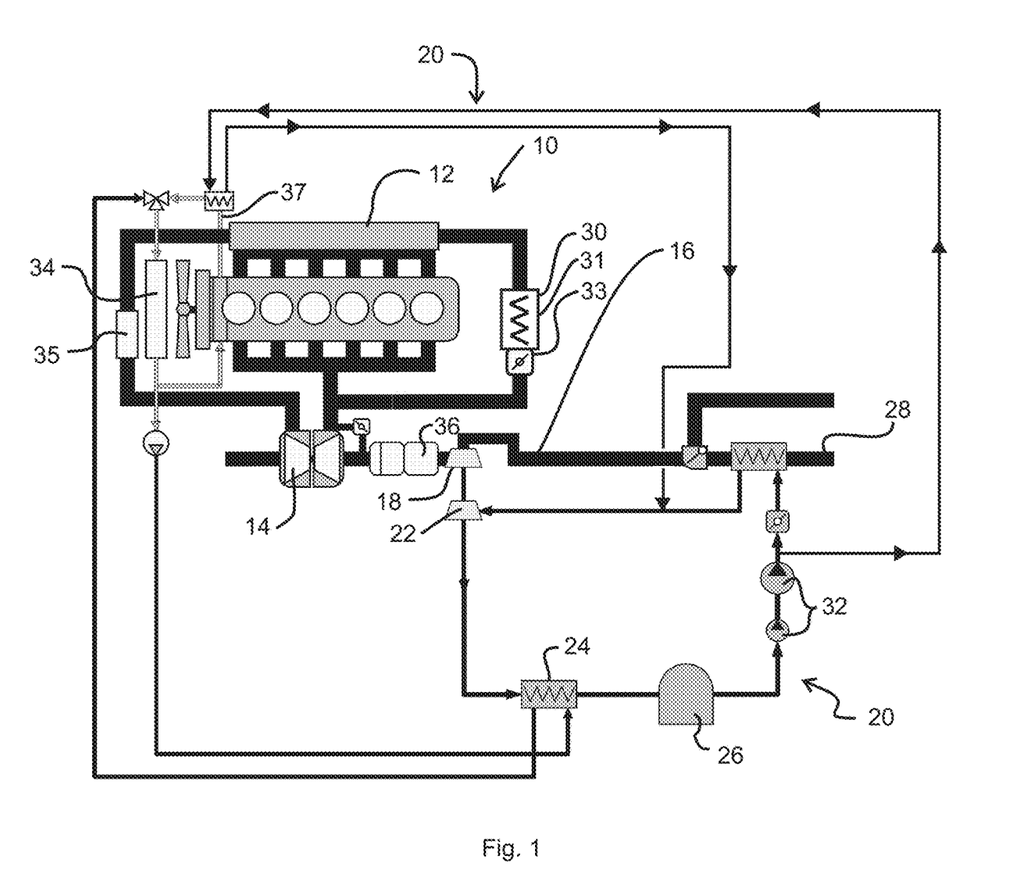
FIG. 1 depicts one variation of a waste heat recovery system.

Referring to FIG. 1; an engine assembly 10 may include a combustion engine 12, a turbocharger 14, a tailpipe exhaust circuit 28 defining an exhaust stream 16, an exhaust gas recirculation system 30, a radiator 34, and charge air cooler 35. A waste heat recovery system 20 may include a first pump 32 which may include a single pump or a plurality of pumps; an evaporator, a thermally driven output device or expander 22 (such as an expander of the turbine, scroll, or piston type, etc.), a condenser 24, and a tank 26. The waste heat recovery system may be constructed and arranged to recover the thermal energy from a tailpipe exhaust circuit or exhaust stream, EGR system, exhaust stream, engine coolant circuit 37, or charge air cooler 35 and may be used to reduce the exhaust pressure to near or below atmospheric conditions for improving the pump efficiency of the engine. FIG. 1 illustrates one variation of a waste heat recovery system constructed and arranged to recover the thermal energy from a tailpipe exhaust circuit and engine coolant circuit but is only illustrative in nature as other configurations and combinations of components and elements other than as expressly described herein and are still considered to be within the scope of the invention.

Figure 2:
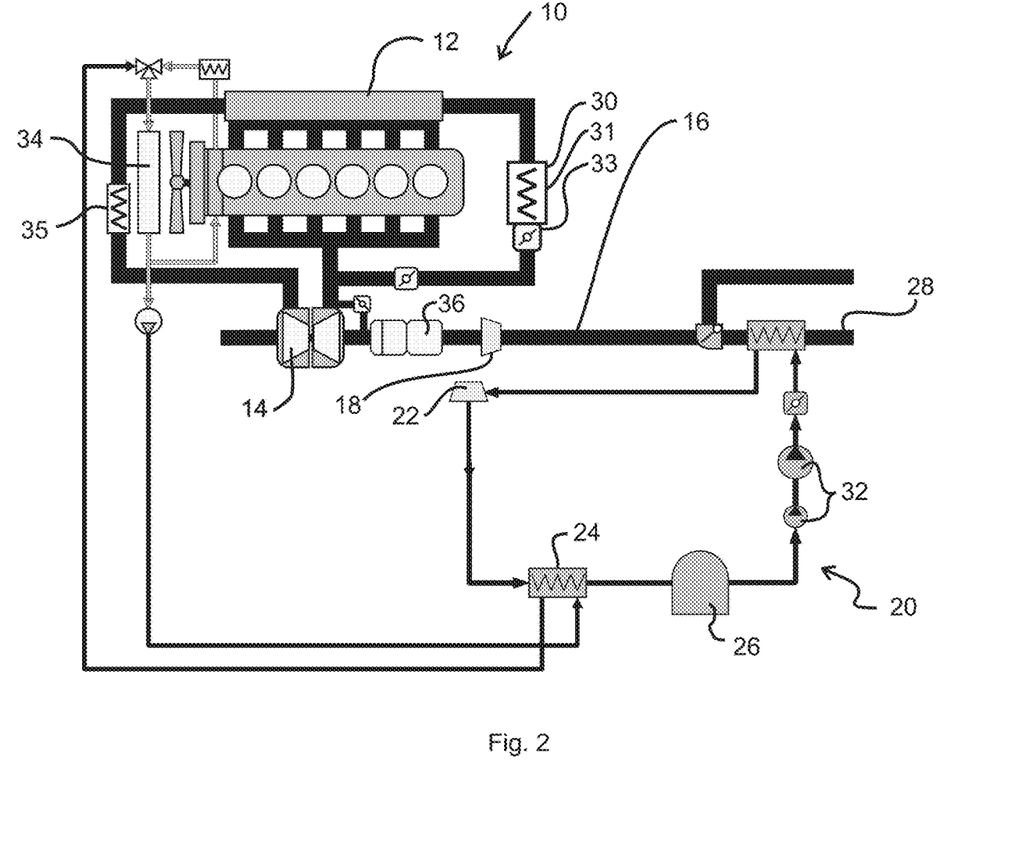
FIG. 2 depicts one variation of a waste heat recovery system.
Figure 4:
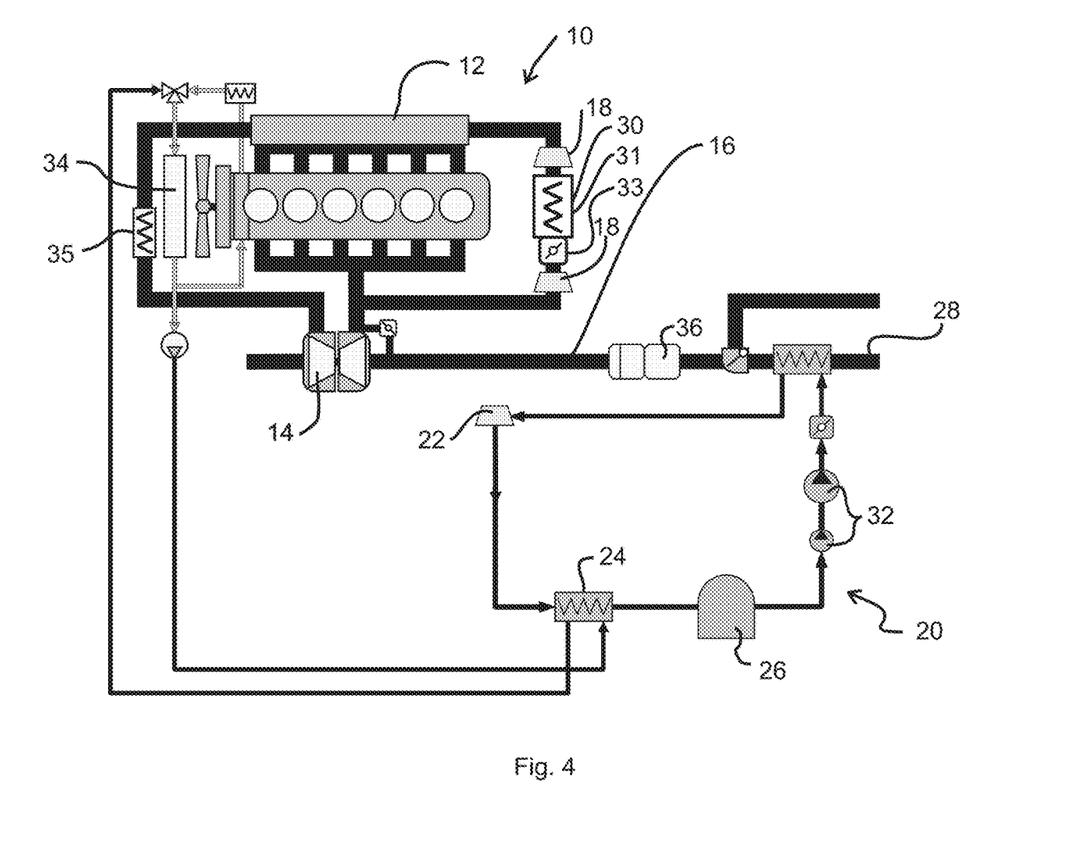
FIG. 4 depicts one variation of a waste heat recovery system.

Referring to FIGS. 2 and 4; an engine assembly 10 may include a combustion engine 12, a turbocharger 14, a tailpipe exhaust circuit 28 defining an exhaust stream 16, an exhaust gas recirculation system 30, a radiator 34, and a charge air cooler 35. A waste heat recovery system 20 may include a thermally driven output device 22 (such as an expander of the turbine, scroll, or piston type, etc.), an exhaust pump 18 that may be distanced from the thermally driven output device 22 but may be in mechanical or electrical communication with the thermally driven output device 22. The exhaust pump 18 may be downstream of the turbocharger 14 as in FIG. 2 or located in the exhaust gas recirculation system 30 located either upstream or downstream of the EGR cooler 31 and EGR valve 33 as in FIG. 4 or both. The waste heat recovery system 20 may further include a first pump 32 which may include a single or a plurality of pumps; a condenser 24, and a tank 26. The waste heat recovery system may be constructed and arranged to recover the thermal energy from a tailpipe exhaust circuit, EGR system, exhaust stream, charge air cooler, or engine coolant and may be used to reduce the exhaust pressure to near or below atmospheric conditions for improving the pumping efficiency of the engine. FIGS. 2 and 4 illustrate variations of a waste heat recovery system constructed and arranged to recover the thermal energy from an exhaust stream but are only illustrative in nature as other configurations and combinations of components and elements other than as expressly described herein and are still considered to be within the scope of the invention.

Figure 3:
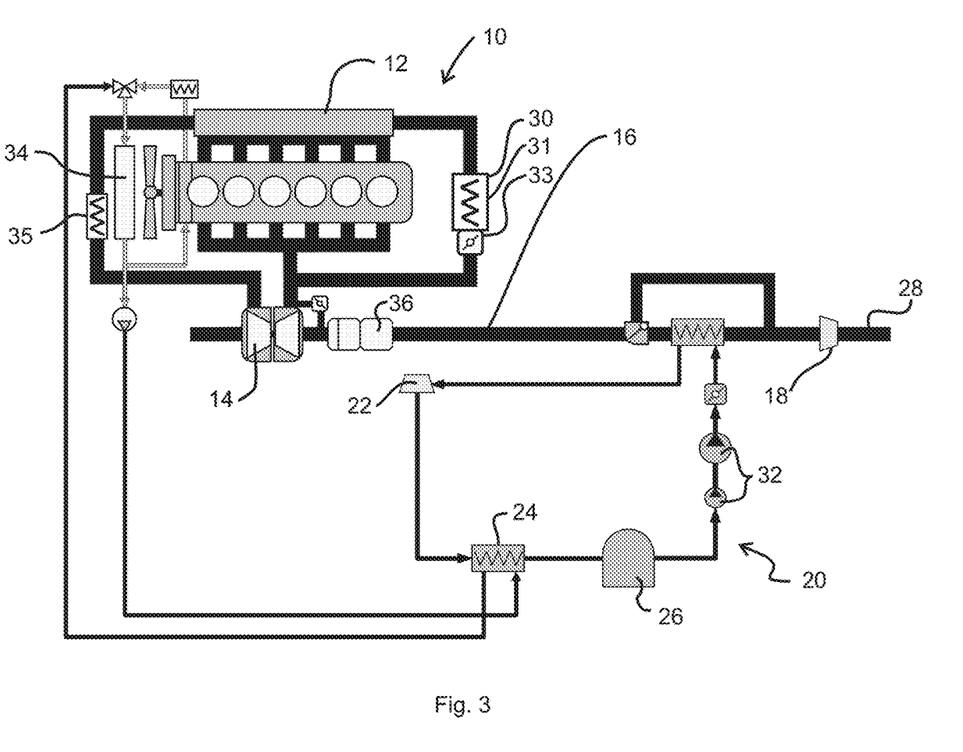
FIG. 3 depicts one variation of a waste heat recovery system.

Referring to FIG. 3; an engine assembly 10 may include a combustion engine 12, a turbocharger 14, a tailpipe exhaust circuit 28 defining an exhaust stream 16, an exhaust gas recirculation system 30, and a radiator 34. A waste heat recovery system 20 may include a thermally driven output device 22 (such as an ORC expander of the turbine, scroll, or piston type, etc.), an exhaust pump 18 that may be distanced from the thermally driven output device 22 but may be in mechanical or electrical communication with the thermally driven output device 22. The exhaust pump 18 may be downstream of an exhaust stream after-treatment 36. The waste heat recovery system 20 may further include a condenser 24, a tank 26, and a first pump 32 which may include a plurality of pumps. The waste heat recovery system may be constructed and arranged to recover the thermal energy from a tailpipe exhaust circuit, EGR system, or exhaust stream and EGR sources and may be used to reduce the exhaust pressure to near or below atmospheric conditions for improving the pump efficiency of the engine. FIG. 3 illustrates one variation of a waste heat recovery system constructed and arranged to recover the thermal energy from a tailpipe exhaust circuit or exhaust stream but is only illustrative in nature as other configurations and combinations of components and elements other than as expressly described herein and are still considered to be within the scope of the invention.

Figure 5:
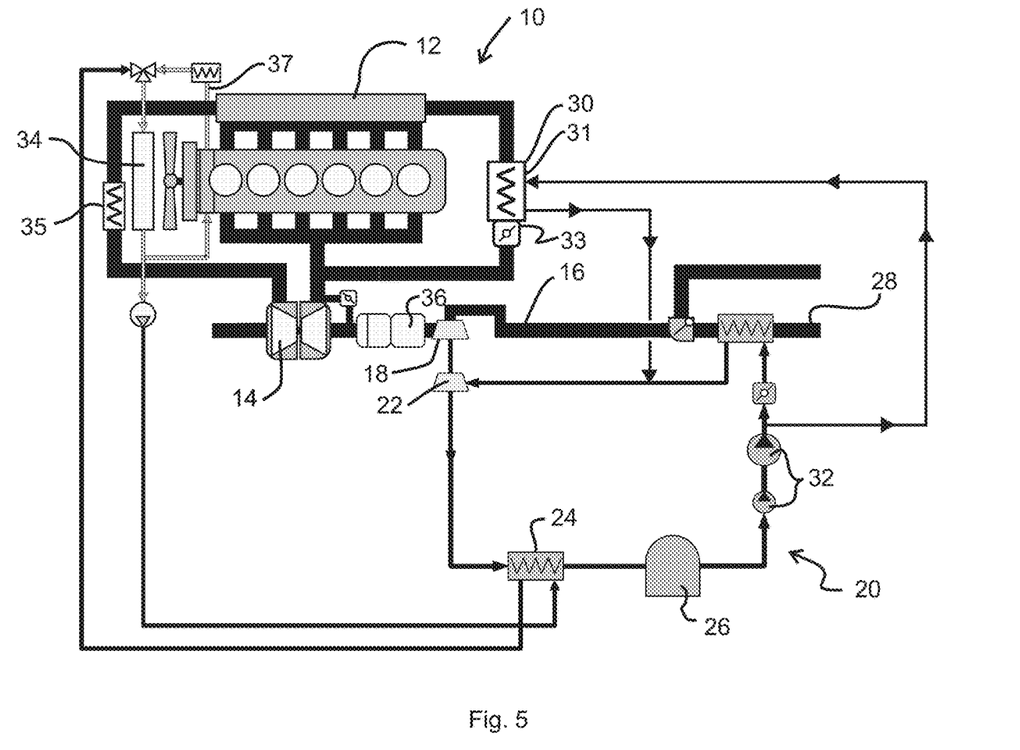
FIG. 5 depicts one variation of a waste heat recovery system.

Referring to FIG. 5; an engine assembly 10 may include a combustion engine 12, a turbocharger 14, a tailpipe exhaust circuit 28 defining an exhaust stream 16, an exhaust gas recirculation system 30, a radiator 34, and charge air cooler 35. A waste heat recovery system 20 may include a first pump 32 which may include a plurality of pumps; an evaporator, a thermally driven output device 22 (such as an expander of the turbine, scroll, or piston type, etc.); a condenser 24; a tank 26 and an exhaust pump 18. The waste heat recovery system may be constructed and arranged to recover the thermal energy from a tailpipe exhaust circuit 28, EGR system 30, exhaust stream 16, engine coolant circuit 37, or charge air cooler 35 and may be used to reduce the exhaust pressure to near or below atmospheric conditions for improving the pump efficiency of the engine. FIG. 5 illustrates one variation of a waste heat recovery system constructed and arranged to recover the thermal energy from a tailpipe exhaust circuit and/or an exhaust gas recirculation system but is only illustrative in nature as other configurations and combinations of components and elements other than as expressly described herein and are still considered to be within the scope of the invention.

According to variation 1, a product may include a combustion engine tailpipe exhaust circuit defining an exhaust stream; an exhaust gas recirculation stream; and a waste heat recovery system that may include an expander assembly that may include a first pump and an expander, the waste heat recovery system may further may include an evaporator, condenser, and a second pump; and wherein the expander is in communication with and drives the second pump which may be in fluid communication with the tailpipe exhaust circuit, exhaust stream, or a exhaust gas recirculation stream and may be constructed and arranged to reduce exhaust pressure in the tailpipe exhaust circuit, exhaust stream, or exhaust gas recirculation stream.

Variation 2 may include a product as set forth in variation 1 wherein the expander may be of the turbine type.

Variation 3 may include a product as set forth in variations 1 or 2 wherein the expander may be of the scroll type.

Variation 4 may include a product as set forth in any of variations 1 through 3 wherein the expander may be of the piston type.

Variation 5 may include a product as set forth in any of variations 1 through 4 wherein the second pump may be in fluid communication with the tailpipe exhaust circuit and exhaust stream and may be constructed and arranged to reduce exhaust pressure in the tailpipe exhaust circuit and exhaust stream to at or below atmospheric conditions.

Variation 6 may include a product as set forth in any of variations 1 through 5 wherein the second pump may be downstream of an exhaust after-treatment in fluid communication with the tailpipe exhaust circuit and exhaust stream.

Variation 7 may include a product as set forth in any of variations 1 through 6 wherein the waste heat recovery system may be constructed and arranged to recover thermal energy at least one of the tailpipe exhaust circuit, exhaust stream, a charge air cooler, an exhaust gas recirculation fluid stream, or a coolant stream.

According to variation 8, a combustion engine assembly may include an exhaust gas recirculation system that may define an exhaust gas recirculation fluid stream; a waste heat recovery system may include an expander assembly that may include a first pump and an expander, the waste heat recovery system further may include an evaporator, a condenser, and a second pump; and wherein the expander may be in communication with and drive the second pump which may be in fluid communication with the exhaust gas recirculation fluid stream and may be constructed and arranged to pump the exhaust gas recirculation fluid stream within the exhaust gas recirculation system.

Variation 9 may include a product as set forth in variation 8 wherein the combustion engine assembly further may include a combustion engine tailpipe exhaust circuit defining an exhaust stream; and further may include a third pump in fluid communication with the tailpipe exhaust circuit and exhaust stream and may be constructed and arranged to reduce exhaust pressure in the tailpipe exhaust circuit and exhaust stream.

Variation 10 may include a product as set forth in variations 8 and 9 wherein the second pump may be downstream of an exhaust after-treatment in fluid communication with the tailpipe exhaust circuit and exhaust stream.

Variation 11 may include a product as set forth in any of variations 8 through 10 wherein the expander may be of the turbine type.

Variation 12 may include a product as set forth in any of variations 8 through 11 wherein the expander may be of the scroll type.

Variation 13 may include a product as set forth in any of variations 8 through 12 wherein the expander may be of the piston type.

Variation 14 may include a product as set forth in any of variations 8 through 13 wherein the second pump may be in fluid communication with the tailpipe exhaust circuit and exhaust stream and may be constructed and arranged to reduce exhaust pressure in the tailpipe exhaust circuit and exhaust stream to at or below atmospheric conditions.

Variation 15 may include a product as set forth in any of variations 8 through 14 wherein the waste heat recovery system may be constructed and arranged to recover thermal energy from at least one of the tailpipe exhaust circuit and exhaust stream, a charge air cooler, the exhaust gas recirculation fluid stream, or a coolant stream.

According to variation 16, a product may include a combustion engine assembly that may include an exhaust gas recirculation system defining an exhaust gas recirculation fluid stream; a waste heat recovery system that may include an expander assembly that may include a first pump constructed and arranged to drive a working fluid within the waste heat recovery system and an expander; a second pump downstream of an exhaust stream after-treatment in fluid communication with the tailpipe exhaust circuit and exhaust stream and which may be constructed and arranged to reduce exhaust pressure in the tailpipe exhaust circuit and exhaust stream; and wherein the waste heat recovery system further may include a condenser, an evaporator, and a third pump; wherein the third pump may be in fluid communication with the exhaust gas recirculation fluid stream and may be constructed and arranged to pump the exhaust gas recirculation fluid stream within the exhaust gas recirculation system.

Variation 17 may include a product as set forth in variation 16 wherein the second pump may be in fluid communication with the tailpipe exhaust circuit and exhaust stream and may be constructed and arranged to reduce exhaust pressure in the tailpipe exhaust circuit and exhaust stream to at or below atmospheric conditions.

Variation 18 may include a product as set forth in any of variations 16 through 17 wherein the waste heat recovery system may be constructed and arranged to recover thermal energy from at least one of the tailpipe exhaust circuit and exhaust stream, a charge air cooler, the exhaust gas recirculation fluid stream, or a coolant stream.

The above description of variations of the invention is merely demonstrative in nature and, thus, variations thereof are not to be regarded as a departure from the spirit and scope of the inventions disclosed within this document.

What is claimed is:

1. A product comprising:
   a combustion engine tailpipe exhaust circuit defining an exhaust stream;
   a waste heat recovery system comprising an expander assembly comprising a first pump and an expander, the waste heat recovery system further comprising an evaporator, a condenser, and an exhaust pump wherein the exhaust pump is not a turbocharger turbine; and
   wherein the expander is in communication with the exhaust pump which is in fluid communication with at least one of the tailpipe exhaust circuit or exhaust stream and is constructed and arranged to reduce exhaust pressure in at least one of the tailpipe exhaust circuit or exhaust stream.

2. A product as set forth in claim 1 wherein the expander is of the turbine type.

3. A product as set forth in claim 1 wherein the expander is of the scroll type.

4. A product as set forth in claim 1 wherein the expander is of the piston type.

5. A product as set forth in claim 1 wherein the exhaust pump is in fluid communication with the tailpipe exhaust circuit and exhaust stream and is constructed and arranged to reduce exhaust pressure in the tailpipe exhaust circuit and exhaust stream to at or below atmospheric conditions.

6. A product as set forth in claim 1 wherein the exhaust pump is downstream of an exhaust after-treatment in fluid communication with the tailpipe exhaust circuit and exhaust stream.

7. A product as set forth in claim 1 wherein the waste heat recovery system is constructed and arranged to recover thermal energy from at least one of the tailpipe exhaust circuit, exhaust stream, a charge air cooler, or a coolant stream.

8. A product as set forth in claim 1 wherein the exhaust pump is in mechanical or electrical communication with the expander.

9. A product comprising:
a combustion engine assembly comprising an exhaust gas recirculation system defining an exhaust gas recirculation fluid stream;
a waste heat recovery system comprising an expander assembly comprising a first pump and an expander, the waste heat recovery system further comprising an evaporator, a condenser, and an exhaust gas recirculation pump;
wherein the expander is in communication with the exhaust gas recirculation pump which is in fluid communication with the exhaust gas recirculation fluid stream and is constructed and arranged to pump the exhaust gas recirculation fluid stream within the exhaust gas recirculation system; and
wherein the combustion engine assembly further comprises a combustion engine tailpipe exhaust circuit defining an exhaust stream; and
wherein the product further comprises an exhaust pump in fluid communication with the tailpipe exhaust circuit and exhaust stream and is constructed and arranged to reduce exhaust pressure in the tailpipe exhaust circuit and exhaust stream and wherein the exhaust pump is not a turbocharger turbine.

10. A product as set forth in claim 9 wherein the exhaust pump is downstream of an exhaust after-treatment in fluid communication with the tailpipe exhaust circuit and exhaust stream.

11. A product as set forth in claim 9 wherein the expander is of the turbine type.

12. A product as set forth in claim 9 wherein the expander is of the scroll type.

13. A product as set forth in claim 9 wherein the expander is of the piston type.

14. A product as set forth in claim 9 wherein the exhaust pump is constructed and arranged to reduce exhaust pressure in the tailpipe exhaust circuit and exhaust stream to at or below atmospheric conditions.

15. A product as set forth in claim 9 wherein the waste heat recovery system is constructed and arranged to recover thermal energy from at least one of the tailpipe exhaust circuit, exhaust stream, a charge air cooler, the exhaust gas recirculation fluid stream, or a coolant stream.

16. A product comprising:
a combustion engine assembly comprising an exhaust gas recirculation system defining an exhaust gas recirculation fluid stream;
a waste heat recovery system comprising an expander assembly comprising a first pump, an evaporator, an expander, and a condenser;
an exhaust pump downstream; and wherein the exhaust pump is not a turbocharger turbine of an exhaust stream after-treatment and which is in fluid communication with the tailpipe exhaust circuit and exhaust stream and is constructed and arranged to reduce exhaust pressure in the tailpipe exhaust circuit and exhaust stream; and
an exhaust gas recirculation pump in fluid communication with the exhaust gas recirculation fluid stream and which is constructed and arranged to pump the exhaust gas recirculation fluid stream within the exhaust gas recirculation system pump downstream; and wherein the exhaust pump is not a turbocharger turbine.

17. A product as set forth in claim 16 wherein the exhaust pump is in fluid communication with the tailpipe exhaust circuit and exhaust stream and is constructed and arranged to reduce exhaust pressure in the tailpipe exhaust circuit and exhaust stream to at or below atmospheric conditions.

18. A product as set forth in claim 16 wherein the waste heat recovery system is constructed and arranged to recover thermal energy from at least one of the tailpipe exhaust circuit, exhaust stream, a charge air cooler, the exhaust gas recirculation fluid stream, or a coolant stream.

19. A product as set forth in claim 16 wherein the expander is in communication with the exhaust pump.

* * * * *

UNITED STATES PATENT AND TRADEMARK OFFICE
CERTIFICATE OF CORRECTION

PATENT NO. : 10,920,658 B2
APPLICATION NO. : 15/803204
DATED : February 16, 2021
INVENTOR(S) : Paul K. Anschel Page 1 of 1

It is certified that error appears in the above-identified patent and that said Letters Patent is hereby corrected as shown below:

In the Claims

Claim 16, Column 8, Lines 19-20: delete "an exhaust pump downstream; and wherein the exhaust pump is not a turbocharger turbine of an exhaust stream" and replace with -- an exhaust pump downstream of an exhaust stream --

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*